US012442914B2

(12) United States Patent
Dore

(10) Patent No.: US 12,442,914 B2
(45) Date of Patent: Oct. 14, 2025

(54) METHOD FOR DETECTING BURIED LONGITUDINAL STRUCTURES BY MEANS OF A GROUND-PENETRATING RADAR

(71) Applicant: COMMISSARIAT A L'ENERGIE ATOMIQUE ET AUX ENERGIES ALTERNATIVES, Paris (FR)

(72) Inventor: Jean-Baptiste Dore, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 345 days.

(21) Appl. No.: 18/126,902

(22) Filed: Mar. 27, 2023

(65) Prior Publication Data

US 2023/0314597 A1    Oct. 5, 2023

(30) Foreign Application Priority Data

Mar. 29, 2022   (FR) ...................... 2202800

(51) Int. Cl.
*G01S 13/88* (2006.01)
*G01S 7/41* (2006.01)
*G01S 13/89* (2006.01)

(52) U.S. Cl.
CPC ............. *G01S 13/885* (2013.01); *G01S 7/411* (2013.01); *G01S 13/89* (2013.01)

(58) Field of Classification Search
CPC ......... G01S 13/885; G01S 7/411; G01S 13/89
See application file for complete search history.

(56) References Cited

U.S. PATENT DOCUMENTS

| 9,965,865 B1 | 5/2018 | Agrawal et al. |
| 11,094,113 B2* | 8/2021 | Mundy ................... G06T 15/06 |
| 11,954,844 B2* | 4/2024 | Kong ...................... G06T 7/001 |

(Continued)

FOREIGN PATENT DOCUMENTS

FR        3 111 994 A1    12/2021

OTHER PUBLICATIONS

Zhang, et al., "Studies of the angular correlation function of scattering by random rough surfaces with and without a buried object", IEEE Trans. Geosci. Remote Sens., vol. 35, No. 2, pp. 444-453, Mar. 1997.

(Continued)

*Primary Examiner* — Marcus E Windrich
(74) *Attorney, Agent, or Firm* — BakerHostetler

(57) ABSTRACT

A method for detecting buried longitudinal structures using a ground-penetrating radar, the method includes the steps of: acquiring a plurality of radar signals for a region of ground, determining, based on the radar signals, a 3D point cloud, each point corresponding to one radar detection and being geolocated in space, searching for at least one set of substantially aligned points in the 3D point cloud by: i. for each straight line among a set of straight lines of the 3D space, determining the number of points of the 3D point cloud that are located at a distance smaller than a predetermined minimum distance from the straight line, ii. determining at least one straight line for which the number of points is higher than a predetermined minimum detection threshold, the points located at a distance from this straight line smaller than said minimum distance characterizing a longitudinal structure.

14 Claims, 16 Drawing Sheets

(56) References Cited

U.S. PATENT DOCUMENTS

| 2013/0321191 | A1 | 12/2013 | Peetz | |
|---|---|---|---|---|
| 2014/0368378 | A1* | 12/2014 | Crain | G01S 13/867 |
| | | | | 342/25 A |
| 2019/0064362 | A1* | 2/2019 | Scott | G01S 13/865 |
| 2019/0383965 | A1* | 12/2019 | Salman | G01V 1/36 |
| 2022/0051427 | A1* | 2/2022 | Nims | G01S 17/894 |
| 2023/0243959 | A1* | 8/2023 | Donderici | G01S 13/87 |
| | | | | 342/70 |

OTHER PUBLICATIONS

Dogaru, et al., "Time-domain sensing of targets buried under a rough air-ground interface", IEEE Trans. Antennas Propag., vol. 46, No. 3, pp. 360-372, Mar. 1998.

Brooks, et al., "A primary study in adaptive clutter reduction and buried minelike target enhancement from GPR data", Proc. SPIE Detection and Remediation Technology for Mines and Minelike Targets V, pp. 1183-1192, 2000.

El-Shenawee, et al., "Monte Carlo simulations for clutter statistics in minefields: AP-mine-like-target buried near a dielectric object beneath 2-D random rough surfaces", IEEE Trans. Geosci. Remote Sens., vol. 40, No. 6, pp. 1416-1426, Jun. 2002.

Carevic, et al., "Modelling GPR echoes from land mines using linear combination of exponentially damped sinusoids", Proc. SPIE Detection and Remediation Technology for Mines and Minelike Targets II, vol. 3079, pp. 568-580, 1997.

Solimene, et al., "Ground Clutter Removal in GPR Surveys", IEEE journal of selected topics in applied earth observations and remote sensing, vol. 7, No. 3, Mar. 2014.

Khan, et al., "Background removal from GPR data using Eigenvalues", 13th Int. Conf. Ground Penetrating Radar (GPR), Italy, 2010.

Solimene, et al., "Entropy based clutter rejection for intra-wall diagnostics," Int. J. Geophys., vol. 2012, 2012.

Capineri, et al., "Advanced image-processing technique for real-time interpretation of ground-penetrating radar images", International Journal of Imaging Systems and Technology 9, 1998.

Carlotto, "Detecting buried mines in ground penetrating radar using a Hough transform approach", Proceedings of SPIE—The International Society for Optical Engineering, 4741, 2002.

\* cited by examiner

N < Nmin

METHOD FOR DETECTING BURIED LONGITUDINAL STRUCTURES BY MEANS OF A GROUND-PENETRATING RADAR

CROSS-REFERENCE TO RELATED APPLICATION

This application claims priority to foreign French patent application No. FR 2202800, filed on Mar. 29, 2022, the disclosure of which is incorporated by reference in its entirety.

FIELD OF THE INVENTION

The invention relates to the field of ground-penetrating radars or georadars which cover all of the techniques making it possible to detect, locate or identify underground targets by means of a radio-frequency system.

BACKGROUND

Underground targets are, for example, piping of different diameters and types (steel, PVC, cement, concrete, etc.) which may be buried at various depths.

One objective of ground-penetrating radars is to locate such objects with precision in order to be able to correctly map a subsurface, for example for safety needs during works.

The images delivered by a ground-penetrating radar contain unwanted elements that may be of a number of types (effect of antenna coupling, thermal noise, radio interference, etc.). When an object is irradiated by the radar, it reflects energy that may be measured. Since the ground is a non-uniform medium, imaging algorithms generally cause a clutter of points of interest to appear. This clutter consists of reflections of the radar signal from an interface between two segments of the ground of different natures or from a reflective object present in the ground (pebbles, stones).

One problem addressed by the present invention is that of detecting and mapping the presence of piping or more generally of longitudinal structures in the ground while decreasing the clutter of points of interest present in the 3D image reconstructed based on the acquired radar signals.

Clutter-decreasing techniques are widely addressed in the literature. Most existing techniques may be classed into two main categories: methods based on modelling of the clutter, and methods aiming to decrease clutter by filtering.

The main disadvantages of methods for modelling clutter reside in the fact that the performance of these techniques is dependent on the adopted clutter model, on the difficulty of precisely estimating the parameters of the model, and/or on prior knowledge of the response of the terrain without targets. Techniques based on modelling of the (clutter and target) signals are especially described in references [1], [2], [3], [4], and [5].

As regards techniques based on filtering clutter, one drawback is that certain methods of this kind as they filter the clutter degrade the signal corresponding to the targets, whereas others need to make the assumption that the clutter signal is stronger than that of the targets or that the frequency spectrum of the clutter signal is concentrated in a region different from that of the signal of the targets. Examples of such methods are given in references [6], [7] and [8].

Moreover, techniques based on shape detection via Hough transform are described in articles [9] and [10]. These methods are exclusively dedicated to 2D detection of the radargram of a ground-penetrating radar on a uniform grid. These methods are based on recognition of a parabola in a radargram for a radar with a single transmit-receive antenna (SISO device).

The invention provides a method for detecting longitudinal structures in a 3D cloud of points of interest that is determined based on a plurality of radar measurements of a region of ground. The proposed method is based on searching for lines in the 3D space that have a sufficient number of points of the point cloud located in proximity to them. Detection of lines in the space of the 3D point cloud makes it possible to characterize longitudinal shapes corresponding to objects to be detected such as piping, pipelines and pipes.

In one variant of embodiment, the invention also makes provision to pre-process the point cloud so as to allow points belonging to the clutter to be filtered by means of a search for unit vectors that are substantially collinear in the 3D point cloud.

Contrary to methods for modelling clutter, the invention requires no assumption to be made in respect of a statistical model of the clutter.

Contrary to existing solutions based on the Hough transform, the provided solution is based on processing of a non-uniformly sampled 3D point cloud, each point corresponding to the potential detection of a region of interest.

SUMMARY OF THE INVENTION

One subject of the invention is a method for detecting buried longitudinal structures using a ground-penetrating radar, the method comprising the steps of:
  acquiring a plurality of radar signals for a region of ground, determining, based on said radar signals, a 3D point cloud, each point corresponding to one radar detection and being geolocated in space, searching for at least one set of substantially aligned points in the 3D point cloud by:
    i. for each straight line among a set of straight lines of the 3D space, determining the number of points of the 3D point cloud that are located at a distance smaller than a predetermined minimum distance from the straight line,
    ii. determining at least one straight line for which said number of points is higher than a predetermined minimum detection threshold, the points located at a distance from this straight line smaller than said minimum distance characterizing a longitudinal structure.

According to one particular aspect of the invention, the search for at least one set of substantially aligned points is carried out by means of steps of:
  determining at least a first straight line located in a first plane, for which straight line a set of points of the 3D point cloud in number higher than said minimum detection threshold is located at a distance from the first straight line smaller than said minimum distance,
  determining at least a second straight line located in a second plane perpendicular to the first plane, for which straight line a sub-set of said set of points in number higher than said minimum detection threshold is located at a distance from the second straight line smaller than said minimum distance,
  the points of said sub-set characterizing a longitudinal structure.

According to one particular aspect of the invention, the search for at least one set of substantially aligned points is carried out by means of steps of:

defining three mutually perpendicular projection planes in the 3D space and, for each of the three planes, determining at least one straight line located in said plane, for which straight line a set of points of the 3D point cloud in number higher than said minimum detection threshold is located at a distance from the straight line smaller than said minimum distance, saving, for each straight line determined in the preceding step, the sets of points located at a distance from the straight line smaller than said minimum distance, constructing a set of points characterizing a longitudinal structure by selecting the points belonging to at least two sets of points saved for two different projection planes.

According to one particular aspect of the invention, the straight lines are defined in a plane by a first parameter regarding distance between the origin of a reference coordinate system and the straight line and a second parameter regarding angle between an axis of the reference coordinate system and a line perpendicular to the straight line and passing through the origin of the reference coordinate system.

In one variant of embodiment, the method further comprises a step of selecting lines for which the sum of the amplitudes of the points of the set of points located at a distance from the line smaller than said minimum distance is larger than a predetermined threshold.

According to one particular aspect of the invention, the points of the 3D point cloud are geolocated using a geolocation device of the ground-penetrating radar.

According to one particular aspect of the invention, the radar signals are acquired for a plurality of planes in the region of ground.

Another subject of the invention is a ground-penetrating radar comprising at least one transmit antenna and at least one receive antenna and a device for detecting buried longitudinal structures in a region of ground, which is configured to execute the steps of the detecting method according to the invention.

Another subject of the invention is a computer program comprising code instructions for executing the method according to the invention when the program is executed by a processor.

Another subject of the invention is a processor-readable storage medium on which is stored a program comprising instructions for executing the method according to the invention, when the program is executed by a processor.

BRIEF DESCRIPTION OF THE DRAWINGS

Other features and advantages of the present invention will become more clearly apparent on reading the following description with reference to the following appended drawings.

DETAILED DESCRIPTION

Figure 1:
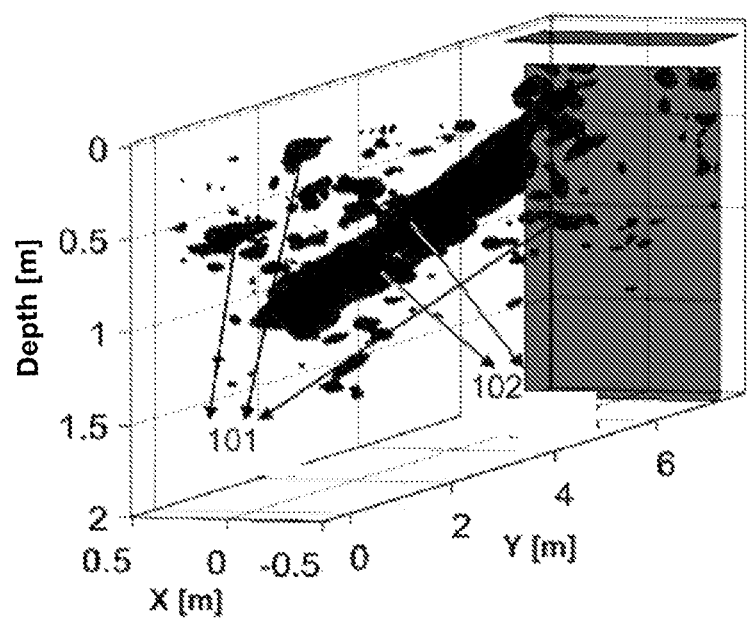
FIG. 1 shows a 3D reconstruction of a scene comprising a pipe and clutter with a radar acquisition method according to the prior art.

FIG. 1 shows a 3D reconstruction of a scene obtained by acquiring measurements using a ground-penetrating radar. The scene is characterized by the presence of a pipe. As explained in the preamble, the images generated based on the measurements acquired by a ground-penetrating radar contain unwanted elements referred to as clutter. In the example of FIG. 1, the 3D reconstruction of points of interest comprises points belonging to the pipe 102 that it is desired to detect but also points 101 belonging to the clutter.

The scene of FIG. 1 is constructed based on a plurality of radar images obtained for a plurality of successive cross-sectional planes of the 3D scene.

One objective of the invention is to decrease the points 101 belonging to the clutter so as to better detect the presence of a longitudinal structure such as a pipe, a pipeline or piping.

Figure 2:
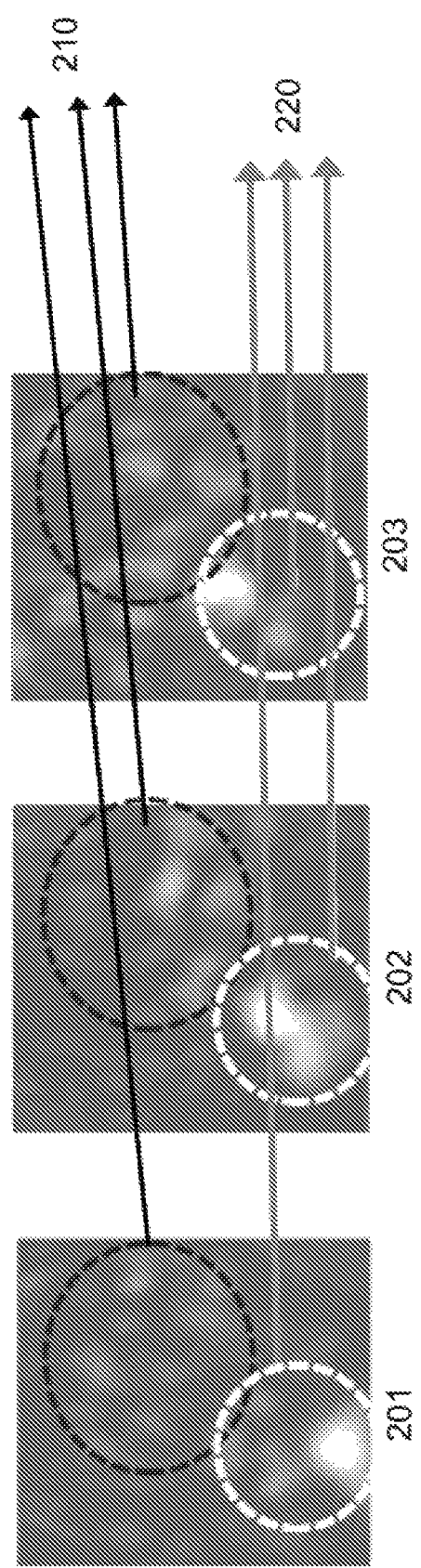
FIG. 2 shows a plurality of successive radar images of the scene of FIG. 1, said images being obtained with an acquisition method according to the prior art.

FIG. 2 shows three radar images 201, 202, 203 successively obtained for three different cross-sectional planes of the scene of FIG. 1.

On analysis of these three cross-sectional planes, it may be seen that the clutter 210 corresponds to noise that is coherent with the target to be detected, i.e. it may be of equivalent amplitude to a target in a radar image. However, the clutter 210 is not spatially coherent as the radar is moved along the scene. This is especially due to the fact that the clutter results from reflections of radar signals from objects that are very small or from interfaces between two types of ground that may vary spatially.

In contrast, it may be seen that an object such as a pipe is spatially coherent, i.e. the same amplitudes are found in the various images corresponding to various cross-sectional planes. In other words, the radar echoes of such a target are spatially correlated in various images corresponding to various cross-sectional planes.

This property is exploited by the invention to search, in a point cloud of the kind illustrated in FIG. 1, for rectilinear or longitudinal shapes, which correspond to the kind of target to be detected, namely pipes, pipelines or piping.

Figure 3:
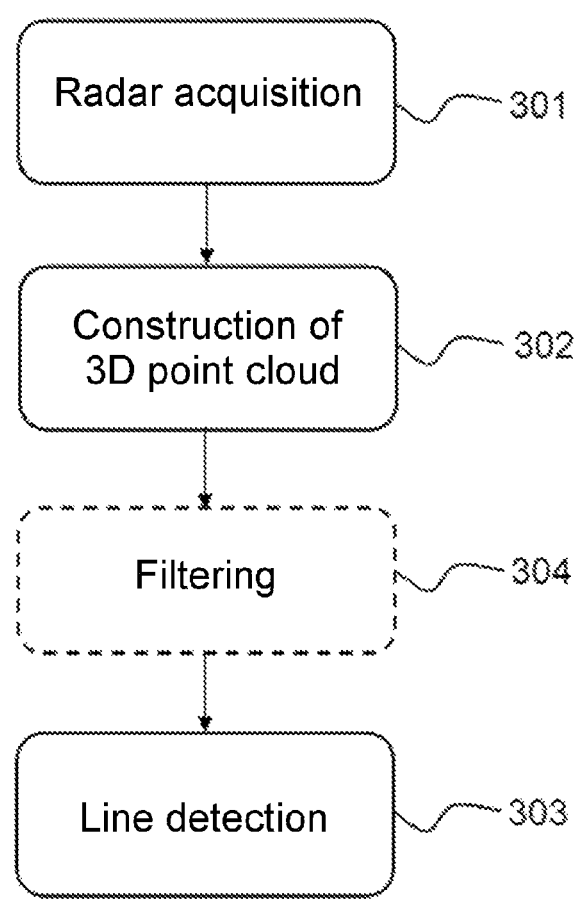
FIG. 3 shows a flowchart of a method for detecting longitudinal structures according to one embodiment of the invention.

FIG. 3 schematically shows the steps for implementing a method for detecting longitudinal structures according to one embodiment of the invention.

The first step 301 consists in acquiring radar images of a plurality of cross-sectional planes of a region of ground, in order to obtain radar images of the kind illustrated in FIG. 2.

The radar images are acquired by means of a ground-penetrating radar comprising at least one transmit antenna and one receive antenna.

The radar is moved over the region to be imaged in order to perform a plurality of successive acquisitions. The raw signals measured are processed in order to generate a radar image each point of which has an intensity characteristic of the reflection of the signals from a buried target.

Step 301 of the method may for example be carried out by means of the acquisition method described in patent application FR 3111994 of the applicant. This application describes use of a so-called MIMO radar (MIMO standing for Multiple Input Multiple Output) having a plurality of transmit and receive antennas coupled to a demodulation algorithm that produces the radar image. Any other radar acquisition method allowing radar images of a plurality of cross-sectional planes of a 3D region may be used.

In step 302, a 3D point cloud is then constructed based on the various radar images of the cross-sectional planes of the scene. This step requires each image to be geolocated, in order to allow a position of the cross-sectional planes and therefore of the points to be deduced. Geolocation may be achieved by means of a device for receiving satellite radio-navigation signals, such as a GPS device, or of an odometer or more generally of any kind of locating device.

Figure 4:
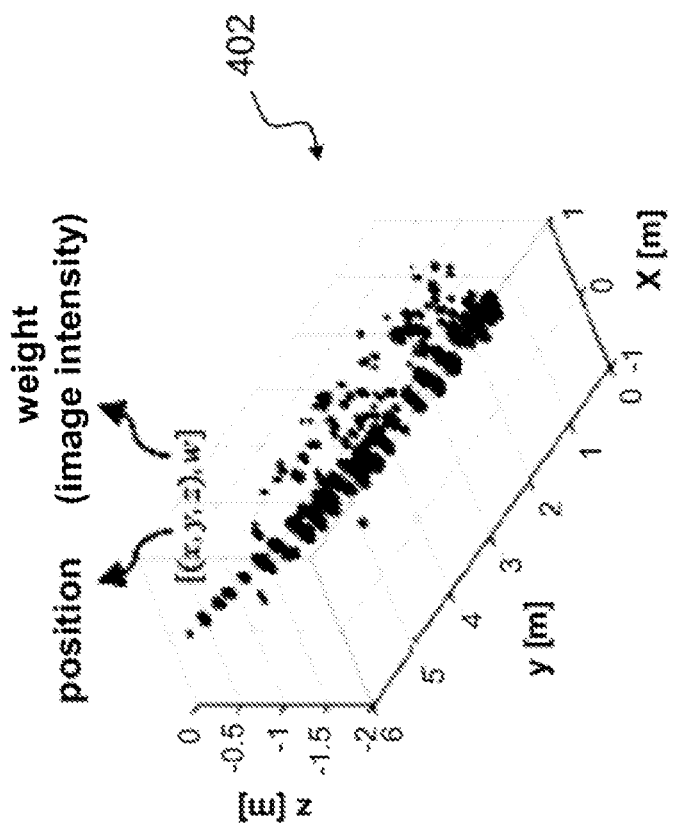
FIG. 4 shows a schematic illustrating construction of a point cloud based on a plurality of successive radar images.
Figure 4:
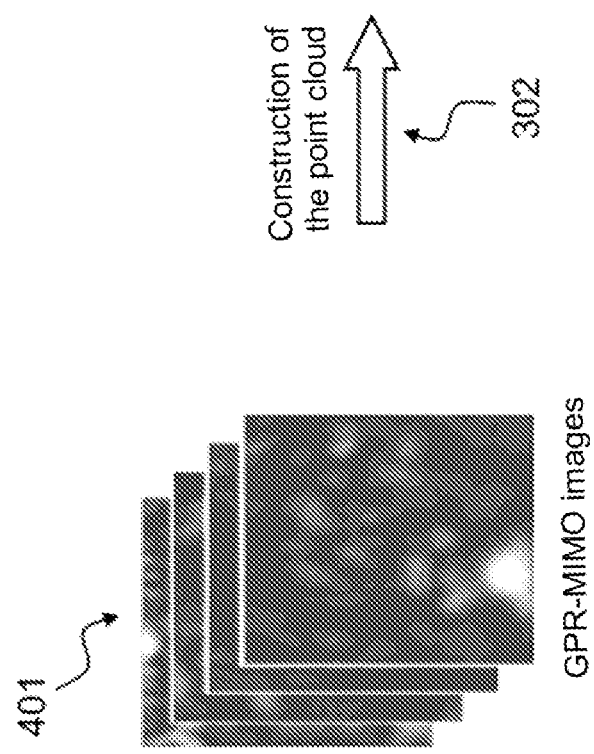

FIG. 4 illustrates step 302 in one example. The radar images 401 are converted into a three-dimensional point cloud 402 in which each point represents an intensity measured in the radar images and located in the 3D space by its spatial coordinates.

In step 303, a method for detecting aligned points in the 3D point cloud 402 is then applied in order to detect lines, corresponding to targets to be detected, and to remove points belonging to the clutter.

Step 303 consists in searching, in the 3D space, for a straight line such that a set of points of the 3D point cloud 402 are located in proximity to this straight line.

To do this, a representation of the straight lines in polar coordinates is used.

A first possible representation of a straight line in 2D space is given by the equation:

$$y = \tan \Phi_0 x + b_0$$

A straight line may therefore be defined in a plane by the pair of parameters $(\Phi_0, b_0)$.

Similarly, the equation of a straight line in space is given by:

$$P = (x, \tan \Phi_0 x + b_0, \tan \Phi_1 x + b_1)$$

A straight line in space may be defined by the four parameters $(\Phi_0, b_0, \Phi_1, b_1)$.

One drawback of the preceding representations is that the slope $\tan \Phi_0$ tends to infinity when the straight line tends towards a parallel to the axis (Oy), this preventing representation of this type of straight line.

Figure 5:
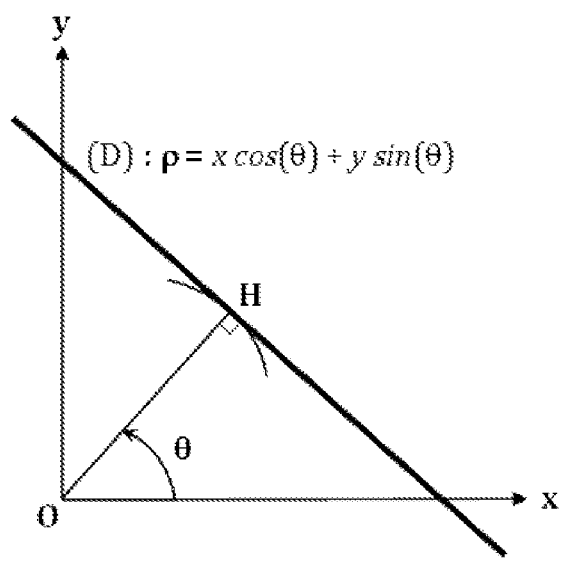
FIG. 5 shows a schematic of a straight line in polar coordinates.

To solve this drawback, another representation is proposed in FIG. 5.

FIG. 5 schematically shows a straight line D defined in a plane (O,x,y) by the equation:

$$\rho = x \cdot \cos(\theta) + y \cdot \sin(\theta)$$

with [OH] the segment perpendicular to the straight line D of length $\rho$ and making an angle $\theta$ to the axis (Ox).

Each straight line D may therefore be represented by its parameters $(\rho, \theta)$.

Similarly, the equation of a straight line in space is defined by four parameters $(\rho_1, \theta_1, \rho_2, \theta_2)$ as the intersection of two planes.

Step 303 of the method according to the invention consists, for each straight line defined by a set of four parameters $(\rho_1, \theta_1, \rho_2, \theta_2)$ varying in a predefined set, in computing a distance, for example a Euclidean distance, between each point of the point cloud and the straight line. Next, points of which the distance to the straight line is smaller than a minimum distance are preserved and the number of obtained points is counted.

This process is iterated for all the possible straight lines of the set, according to a predefined sampling scheme.

Next, only straight lines for which the set of points detected to be in their proximity contains a number of points higher than a minimum number allowing a longitudinal structure to be characterized are preserved.

Thus, the method according to the invention allows one or more lines in the 3D point cloud to be detected, these lines approximately joining a set of points of the cloud or being close to this set. Each set of points in proximity to a detected line corresponds to a longitudinal structure that it is desired to detect in the point cloud.

Figure 6:
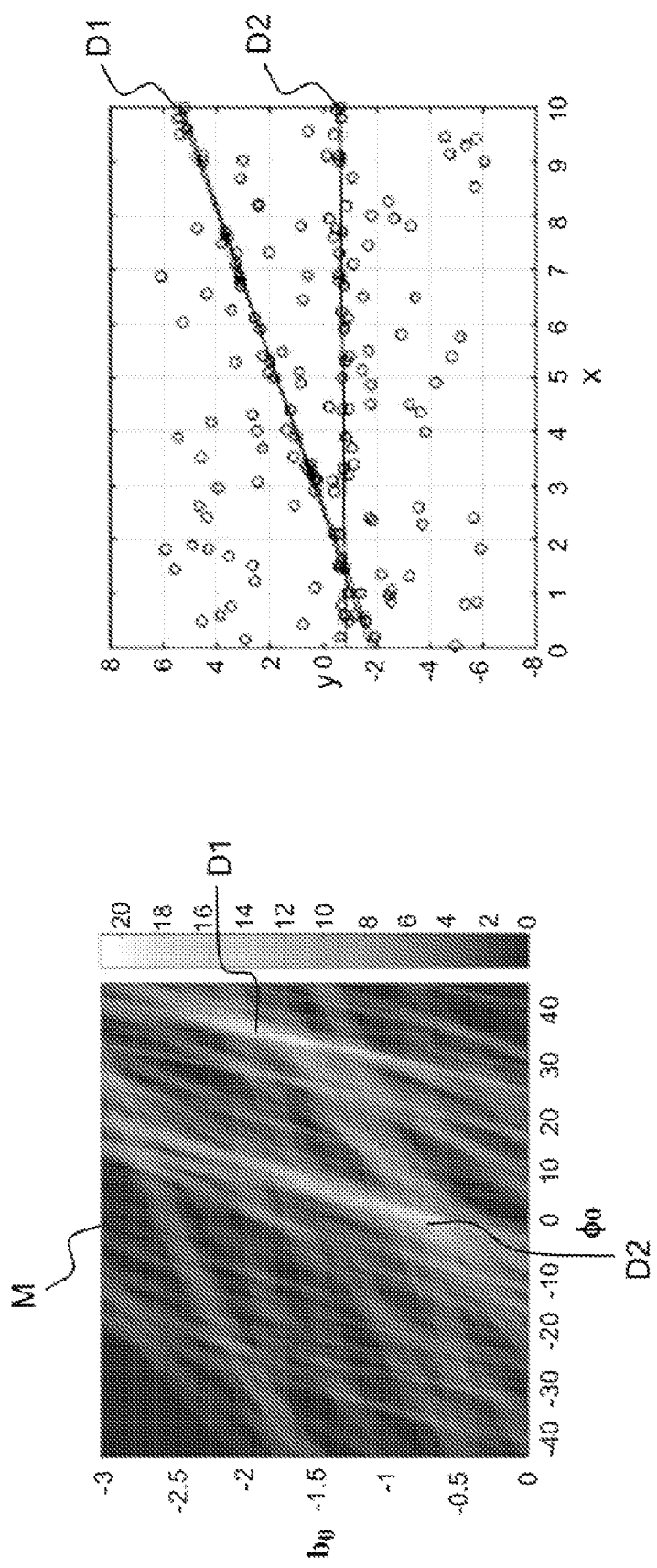
FIG. 6 shows an accumulator matrix and one example of result of detection of lines in a point cloud.

FIG. 6 schematically shows, by way of illustration, on the left of the figure, one example of an accumulator matrix M giving, for each straight line defined by a pair of parameters $(\Phi_0, b_0)$, the number of points of a point cloud in proximity to this straight line. On the right of FIG. 6 a point cloud in a plane (O,x,y) has been shown, in which two lines D1,D2 have been detected. These two lines D1, D2 are also identified in the matrix M by two points of maximum amplitude in the plane $(\Phi_0, b_0)$.

Figure 7:
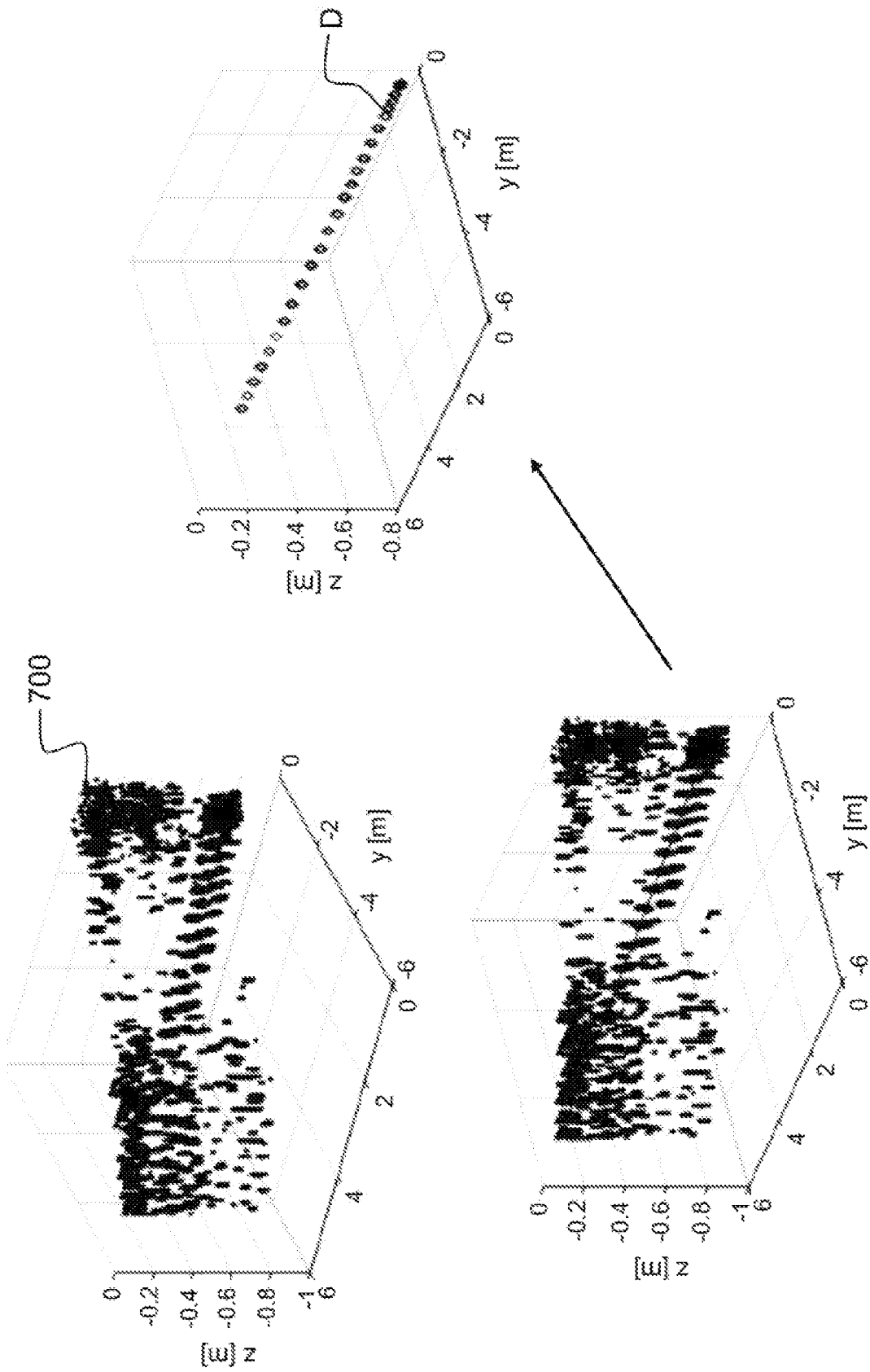
FIG. 7 shows an example of the result of detection of lines in a point cloud.

FIG. 7 schematically shows one example of results of detection of a line D in 3D space based on a point cloud 701.

A number of ways of carrying out the step 303 of detecting lines of the method according to the invention in 3D space are conceivable.

According to a first variant of embodiment, lines are detected using an approach in which successive planes are considered, the space defined by a pair of parameters $(\rho, \theta)$ being scanned with two orthogonal planes, the planes (XY) and (XZ) for example.

More precisely, a first search is carried out to determine the sets of points of the 3D point cloud that are close to the straight lines of parameters $(\rho, \theta)$ in a first plane (for example the plane (XY)). Next, among the points selected in this first search, a second search is carried out for straight lines of the second plane (for example the plane (XZ)).

Figure 8:
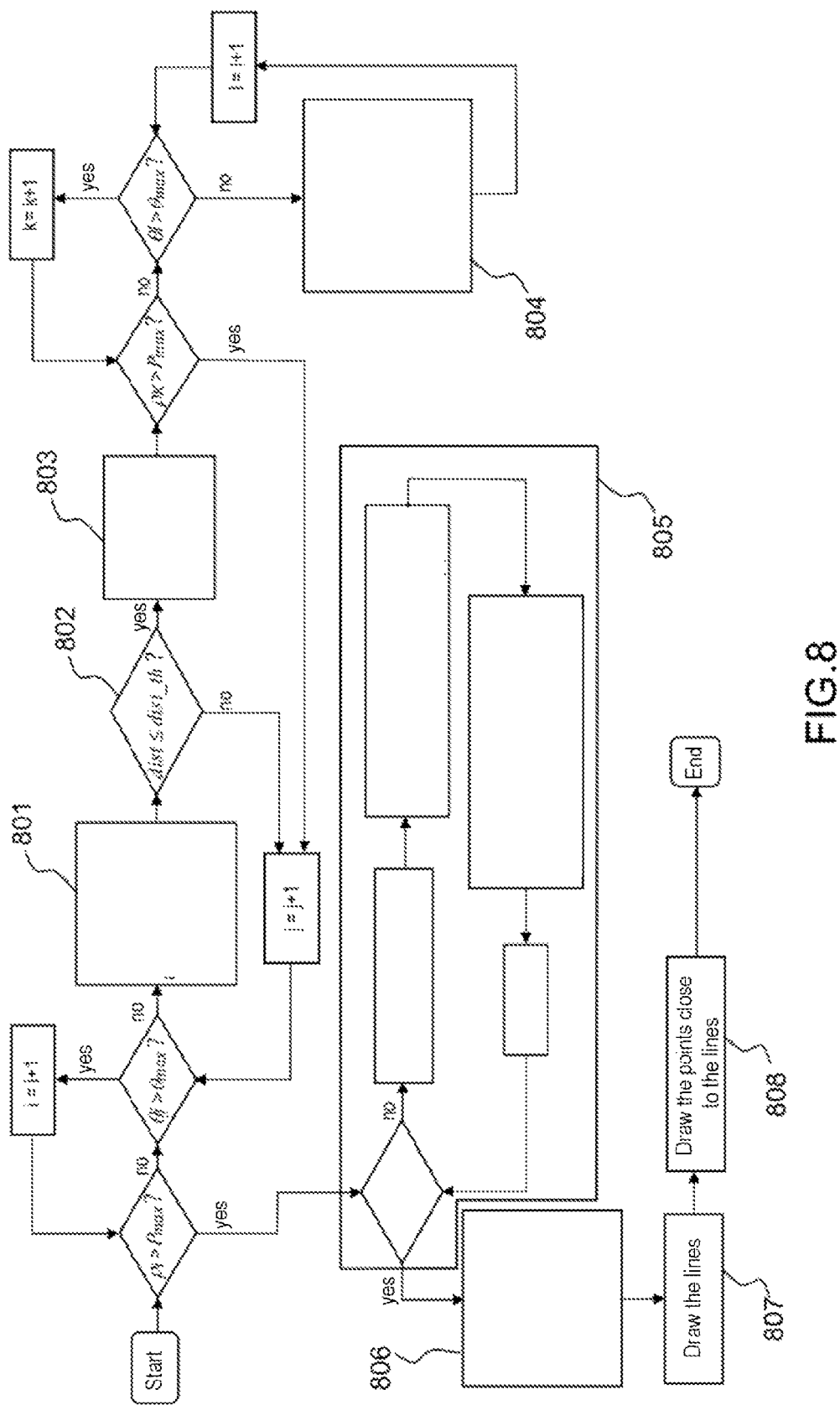
FIG. 8 shows, in a flowchart, a first example of embodiment of the method according to the invention.

FIG. 8 illustrates one example of implementation of this first variant of embodiment.

The parameters of the straight lines in the plane (XY) are denoted $(\rho_i, \theta_j)$ and the parameters of the straight lines in the plane (XZ) are denoted $(\rho_k, \theta_l)$. These parameters are varied in the intervals $[0; \rho_{max}]$ and $[0; \theta_{max}]$, respectively.

In step 801, a distance between each point of the 3D point cloud and the straight line defined by the parameters ($\rho_i$, $\theta_j$) in the plane (XY) is computed. This distance is, for example, a Euclidean distance between a point and its projection onto the straight line.

In step 802, each distance computed in step 801 is compared with a threshold distance dist_th. If the distance is larger than the threshold distance, the point is not retained, otherwise step 803 is passed to, in which step the points P the distance of which is smaller than the threshold distance dist_th are selected to form a set of points close to the straight line ($\rho_i$, $\theta_j$).

Next, among the set of points P determined in step 803 for the straight line ($\rho_i$, $\theta_j$), the number of points close to each straight line of the plane (XZ) parametrized by the parameters ($\rho_k$, $\theta_l$) are determined and these numbers are saved in a matrix A.

The process is iterated for all the straight lines of the first plane (XY).

At the end of steps 801-804, a matrix A giving, for each pair of straight lines parametrized by ($\rho_i$, $\theta_j$, $\rho_k$, $\theta_l$), the number of points of the point cloud in proximity to these two straight lines is obtained.

Next, in step 805, the maxima of the matrix A are sought with a view to determining the sets of points corresponding to nbmax lines, with nbmax the number of lines to be found in the 3D space.

In step 806, solely the straight lines and associated sets of points for which the number of points of the set is higher than a detection threshold corresponding to a minimum number of points allowing a longitudinal structure to be characterized are preserved.

In step 807, the obtained lines are drawn then, in step 808, the points close to these lines are selected.

To carry out step 808, i.e. to select the points of the point cloud that correspond to the lines obtained in 3D space based on lines determined for two projection planes (XY) and (XZ), for each pair of lines belonging to the two planes, respectively, the number of points in common of these two lines is sought, and if this number is higher than a predetermined threshold Tu, these points are added to a list of retained points.

One drawback of the first variant of embodiment illustrated in FIG. 8 is the cost in terms of computation because of the need to scan the space through variation of 4 parameters (two polar-coordinate parameters per plane).

According to a second variant of embodiment, the line-detecting step 303 may be carried out using an approximate algorithm that has a lower cost and complexity than the first variant.

This second variant consists in scanning the three projection planes of the 3D space, namely the planes (XY), (YZ) and (XZ) independently, so as to accelerate the process of line detection.

Figure 9:
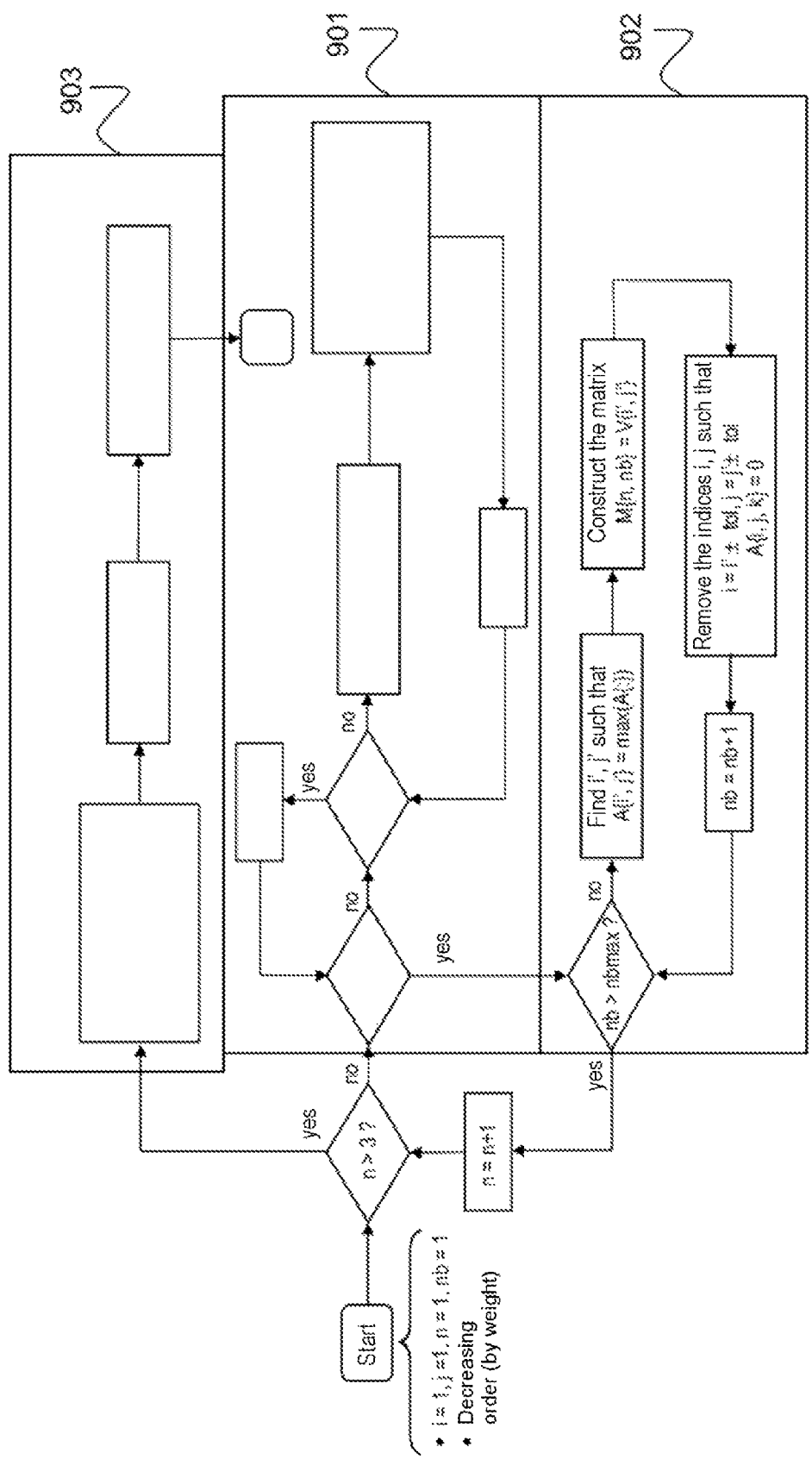
FIG. 9 shows, in a flowchart, a second example of embodiment of the method according to the invention.

FIG. 9 illustrates, in a flowchart, the steps for implementing this second variant.

For each projection plane (indexed by the index n in FIG. 9), all of the straight lines of the plane are scanned through variation of the pair of parameters ($\rho_i$, $\theta_j$) so as to seek the points of the point cloud closest to each straight line (steps 901).

The indices of the sets of points close to each straight line are preserved in a matrix V(i,j) and the number of points of each set is preserved in a matrix A(i,j).

As in the first variant, the proximity of the points is measured by a parameter that defines a maximum Euclidean distance between the line defined by ($\rho_i$, $\theta_j$) and the points of the cloud. The indices of points under the maximum distance are stored in the matrix V, which is used later on to allow the lines to be drawn.

The following step 902 consists in constructing, based on the indices saved in the matrix V, a matrix M that contains, for each projection plane, the highest occurrences of the number of indices. An occurrence corresponds to the indices of the points of the cloud that are close to the straight line obtained based on ($\rho_i$, $\theta_j$). The maximum number of occurrences, which corresponds to the maximum number of lines to be detected, is defined by the parameter nbmax. The value of this parameter is such that the existing number of targets is covered. These occurrences are stored by decreasing size of the number of indices close to the lines defined based on ($\rho_i$, $\theta_j$).

This matrix M is constructed using another matrix A which stores, in turn, the number of indices of points close to a line. In order to remove similar occurrences (nearby lines), a tolerance is established on the indices of the matrix A and, said matrix, zeroed for the set of indices in the margin of tolerance.

Thus, at the end of step 902, straight lines (of maximum number equal to nbmax) for which the number of points located in their proximity is highest will have been retained.

The operations 901, 902 are carried out for each of the three planes (XY), (YZ) and (XZ) independently.

Next, a voting system 903 is used to select the lines in the 3D space.

Step 903 first consists in establishing a threshold in order to preserve the highest occurrences among the nbmax occurrences. This prevents, subsequently, short segments of aligned points that do not correspond to a target that it is desired to detect from being drawn. In other words, there is a minimum number of aligned points corresponding to a longitudinal structure.

Next, the matrices M obtained for the 3 planes are combined, for example by retaining the sets of points present in at least two of the three projection planes.

The criterion of selection of the indices of points that define a line finally retained in the 3D space is given by:
$$S^{(nb*)} = (S^{(nb*)}_{XY} \cap S^{(nb*)}_{XZ}) \cup (S^{(nb*)}_{XZ} \cap S^{(nb*)}_{YZ}) \cup (S^{(nb*)}_{XY} \cap S^{(nb*)}_{YZ}),$$
with $S^{(nb*)}_{XY}$, $S^{(nb*)}_{XZ}$, $S^{(nb*)}_{YZ}$ the sets of indices of points obtained for each of the three projection planes for the occurrence nb*.

Once the set of indices of points has been determined for each occurrence nb* (corresponding to one straight line), the line that best fits the corresponding set of points is drawn, then the points of the 3D point cloud that are closest to this line are drawn by again computing a distance between all the points of the cloud and the line finally retained.

In one variant of embodiment, the method described in FIG. 9 may be carried out for a single of the three projection planes or for only two projection planes among the three planes by adapting the criterion of selection of the indices of the points finally retained.

In another variant of embodiment, a step 304 of filtering the points of the 3D point cloud is carried out before the line-detecting step 303.

The filtering step 304 is carried out using a method for detecting aligned points in the 3D point cloud, in order to remove points belonging to the clutter.

Step 304 is a step of searching for similar unit vectors, or in other words unit vectors that are substantially collinear between pairs of points forming thus a line.

Figure 10:
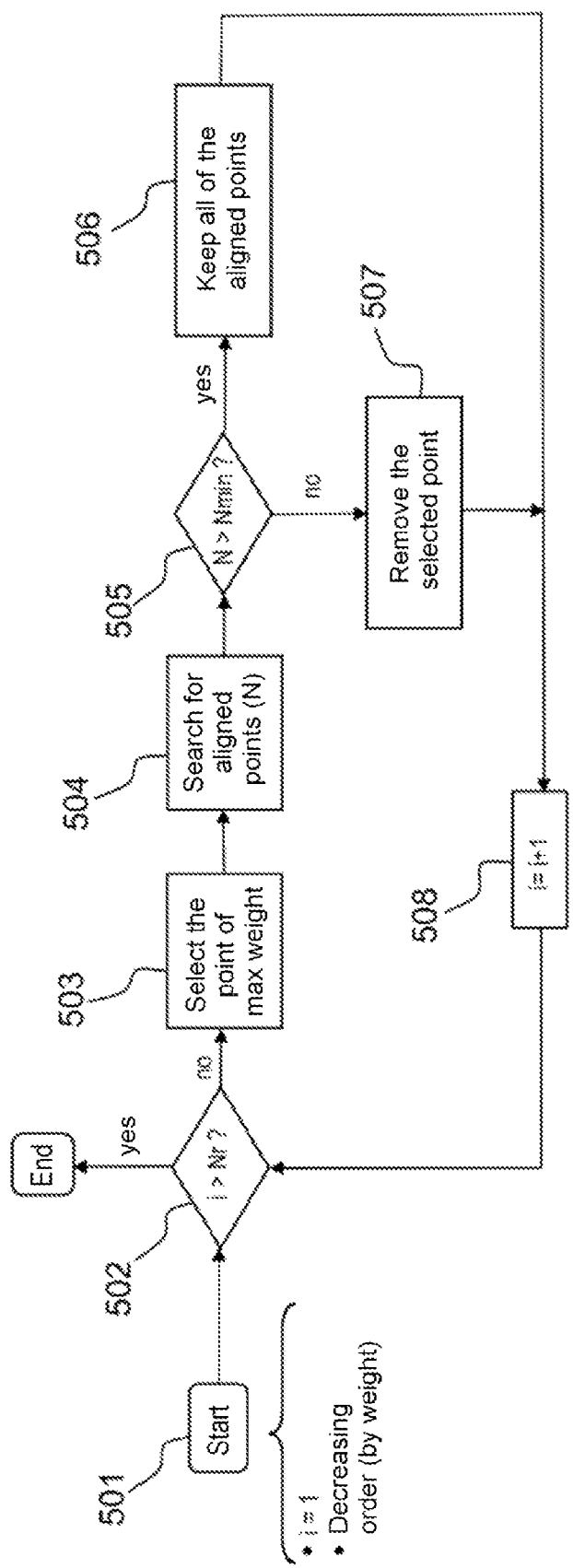
FIG. 10 shows a flowchart of one particular embodiment of the method illustrated in FIG. 3.

FIG. 10 illustrates in detail one example of implementation of step 304.

The algorithm of FIG. 10 is illustrated by an example given in FIGS. 11a to 11i.

Figure 11A:
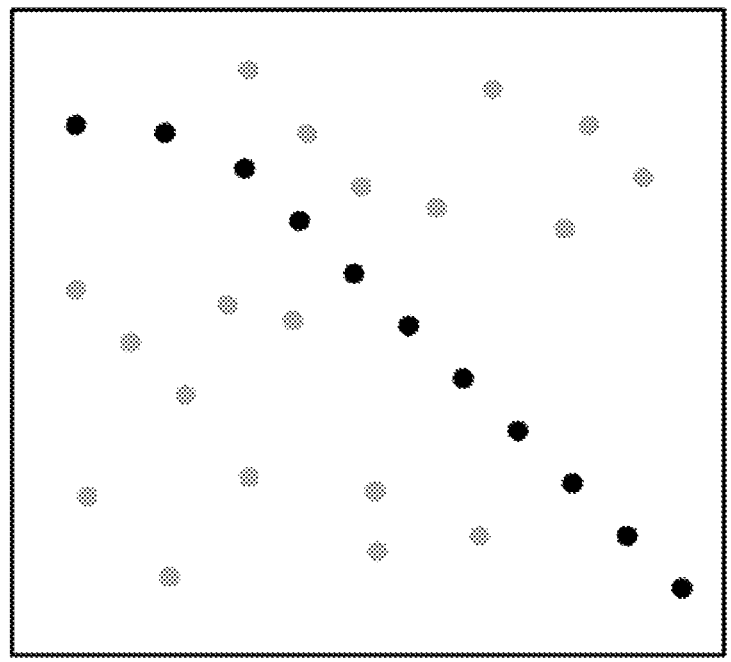
FIG. 11a shows an illustration of a step of the method of FIG. 10.
Figure 11B:
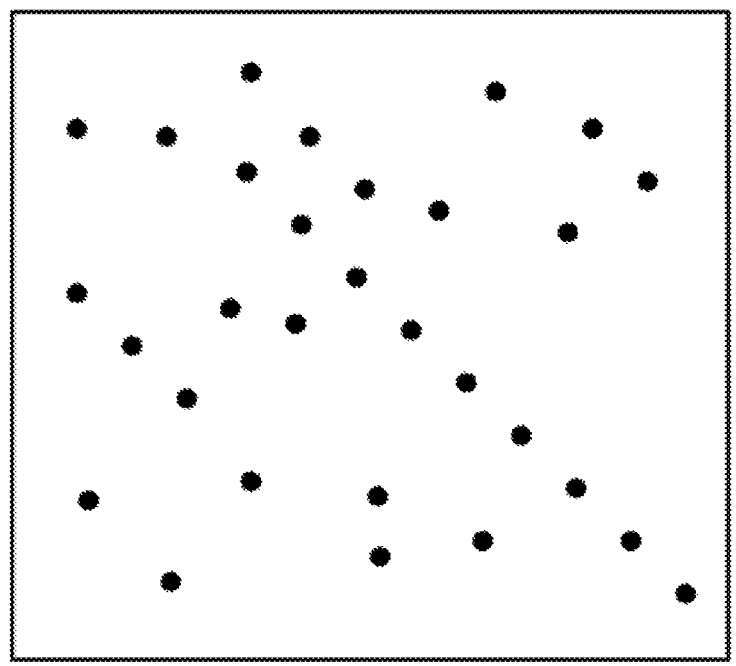
FIG. 11b shows an illustration of a step of the method of FIG. 10.

FIG. 11b schematically shows a set of points of a 3D point cloud received as input of step 304. To simplify, the point cloud of FIG. 11b has been shown in two dimensions but the principle described applies identically to a cloud in three dimensions.

FIG. 11a shows the same point cloud, the darkest points identifying points that correspond to piping describing substantially a line.

The algorithm of FIG. 10 starts with a step 501 in which the points of the 3D point cloud are ordered in a list to be processed in order of decreasing amplitude.

An index i is initialized to 1 corresponding to the number of lines to be detected in the point cloud. In step 502, the method continues if i is lower than or equal to Nr the maximum number of lines that it is sought to detect.

Figure 11C:
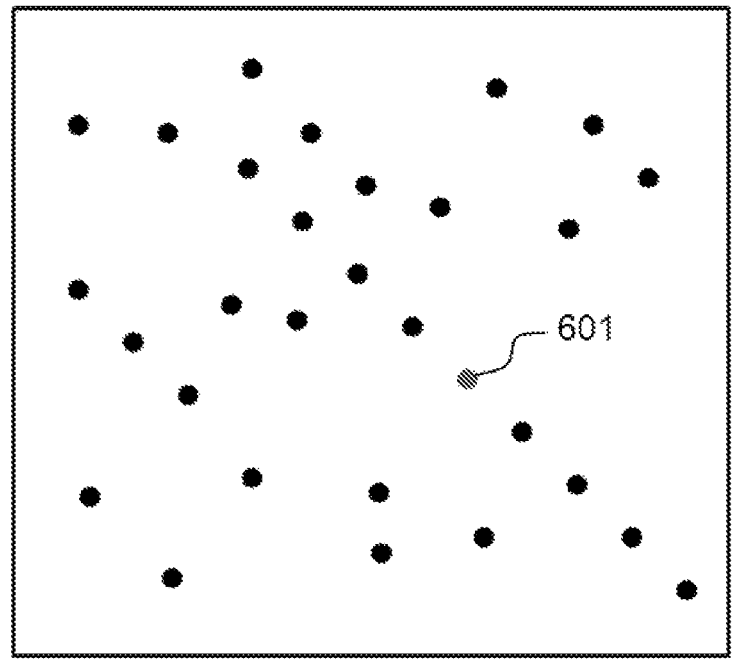
FIG. 11c shows an illustration of a step of the method of FIG. 10.

In step 503, the first point of the list (that of highest amplitude) is selected. This step is illustrated in FIG. 11c by the point 601.

In step 504, the set of points that are aligned or substantially aligned with the selected point 601 is sought.

Figure 11D:
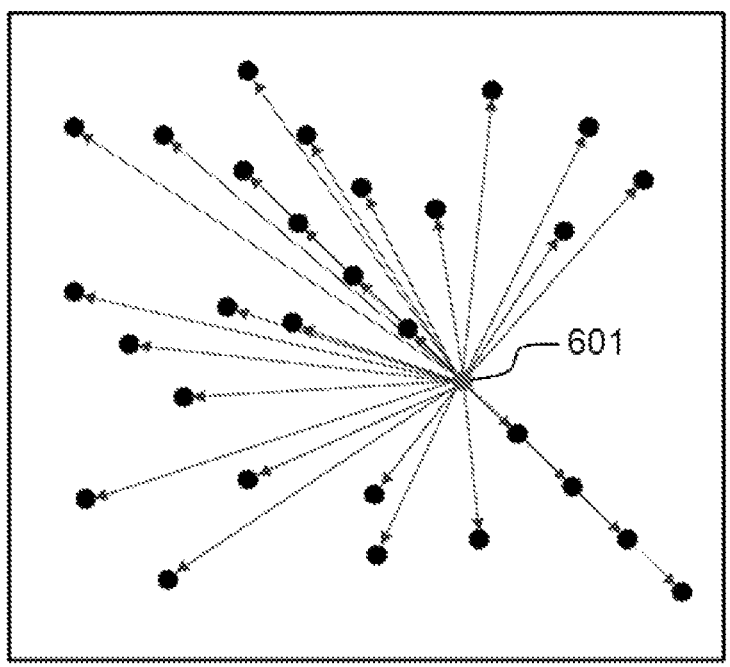
FIG. 11d shows an illustration of a step of the method of FIG. 10.

To do this, first all the unit vectors having as start point the selected point 601 and the direction of which is given by one of the other points of the point cloud are determined. This step is illustrated in FIG. 11d.

The unit vectors are given by the formula:

$$u_{jk} = \frac{p_j - p_k}{\|p_j - p_k\|},$$

where $p_k$ is the start point 601 and $p_j$ is the end point.

Figure 11E:
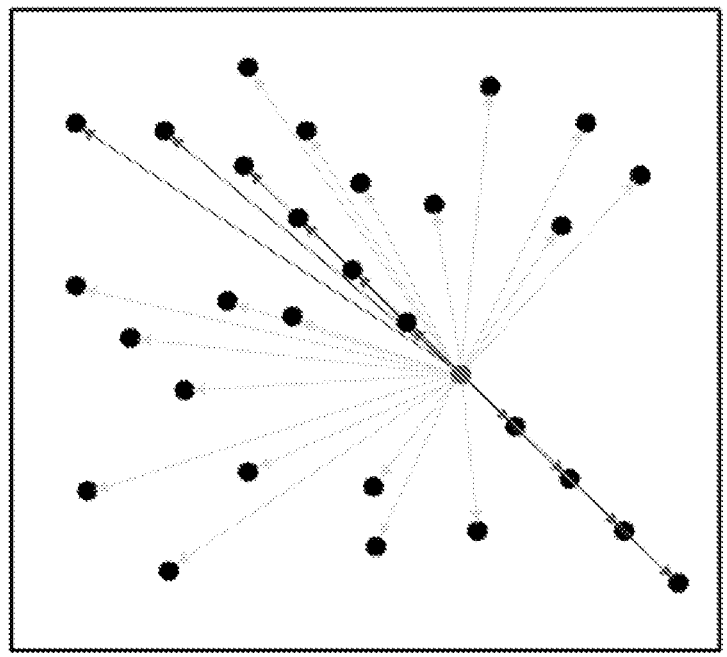
FIG. 11e shows an illustration of a step of the method of FIG. 10.

Among all the computed unit vectors, those that are substantially collinear with a predetermined margin of tolerance are retained. This step is shown in FIG. 11e.

There are a number of possible solutions that may be used to determine the set of substantially collinear vectors.

A first solution consists in executing the following steps.

Firstly, a rotation of 180° is applied to unit vectors a coordinate (for example the x-coordinate) of which is negative:

if $u_{jkx} < 0 \rightarrow u_{jk} \leftarrow -u_{jk}$

This step allows all the unit vectors almost aligned in a common direction to be obtained.

Next, each component of $u_{jk}$ is approximated to n significant digits. For example, n is set equal to 2 or 3. Use of n>3 is recommended only in a very noisy scenario.

Next, for each component, the dominant value among all the approximated unit vectors is computed. In other words, the largest set of vectors having the same approximate component value is sought.

Next, the results obtained for the three components x,y,z are combined in order to determine points that are almost aligned, with a tolerance given by the approximation by the number n.

One possible combination consists in collating all the points present in at least two projection planes. In other words, if the sets of indices of the points of the cloud with the most recurrent value of the components x,y,z are denoted $I_x, I_y, I_z$, respectively, the set of almost aligned points is given by the following formula:

$I = (I_x \cap I_y) \cup (I_x \cap I_z) \cup (I_y \cap I_z)$, where $\cup$ designates the union operator and $\cap$ designates the intersection operator.

Another possible approach consists in measuring the angle between each pair of unit vectors and in preserving all of the points for which the absolute value of this angle does not exceed a predetermined threshold close to 0 and dimensioned to accept a certain tolerance in the alignment of the points.

A third possible approach consists in converting the unit vectors into spherical coordinates (r, θ, φ) and in introducing a tolerance into the angular variations of the angular components (θ, φ).

To do this, a histogram of the values of each angular component (θ, φ) is computed. The histogram is defined by an increment that gives the desired tolerance in the angular variation.

Next, the most recurrent values in these two histograms are determined by taking into account phase ambiguities (modulo π).

The sought set of almost aligned points corresponds to the intersection of the points having the most recurrent values of the two angular components, respectively.

At the end of step 504, a set of points that are almost aligned with the point selected in step 503 is obtained.

Next, in step 505, the number of points of the obtained set is compared with a threshold $N_{min}$ that is a minimum number of points that may be considered to belong to a target. This threshold is set depending on the type of structure that it is desired to detect. In the case of pipes, pipelines or piping, this threshold allows detection of objects of small size that may rather belong to the clutter to be excluded. The threshold value $N_{min}$ especially depends on the resolution of the movement of the radar. If the measurements carried out by the radar are very spaced apart spatially, the value of the threshold $N_{min}$ may be set very low. If in contrast the measurements are not very spaced apart, this value may be set higher. The value of the threshold $N_{min}$ also depends on the size of the 3D region scanned by the radar and on the length of the structures to be detected. The value of the threshold $N_{min}$ is for example set in the interval [10; 50].

If the number of points of the set is strictly higher than $N_{min}$ then, in step 506, all the aligned points are preserved, these being associated with a detected structure. These points are then withdrawn from the list to be processed and the index i of the list is incremented (step 508) to pass to the following point of highest amplitude among the remaining points.

If the number of points of the set is lower than or equal to $N_{min}$ then the point selected in step 503 is removed (step 507) from the list to be processed and is considered to belong to the clutter—it is therefore filtered from the 3D point cloud.

Figure 11F:
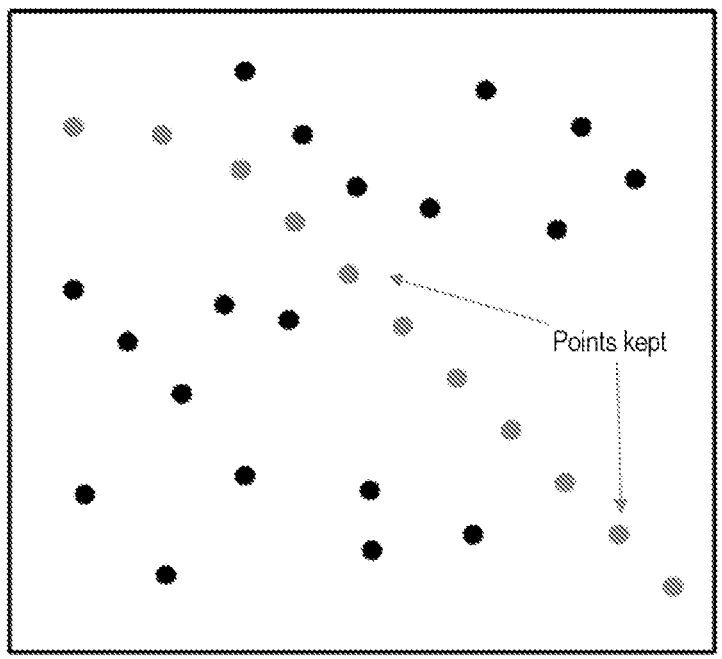
FIG. 11f shows an illustration of a step of the method of FIG. 10.

Steps 505 to 507 are illustrated in FIGS. 11f to 11j. FIG. 11f illustrates the almost aligned points preserved after the first iteration.

Figure 11G:
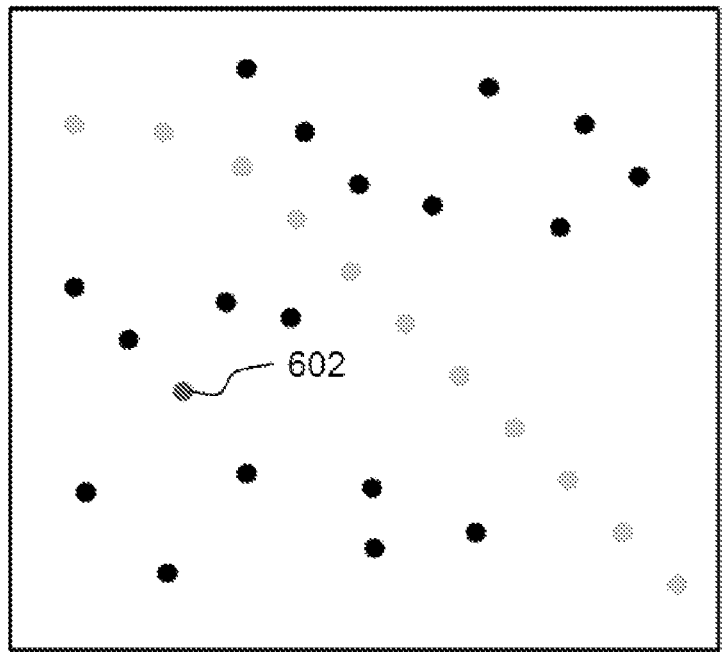
FIG. 11g shows an illustration of a step of the method of FIG. 10.
Figure 11H:
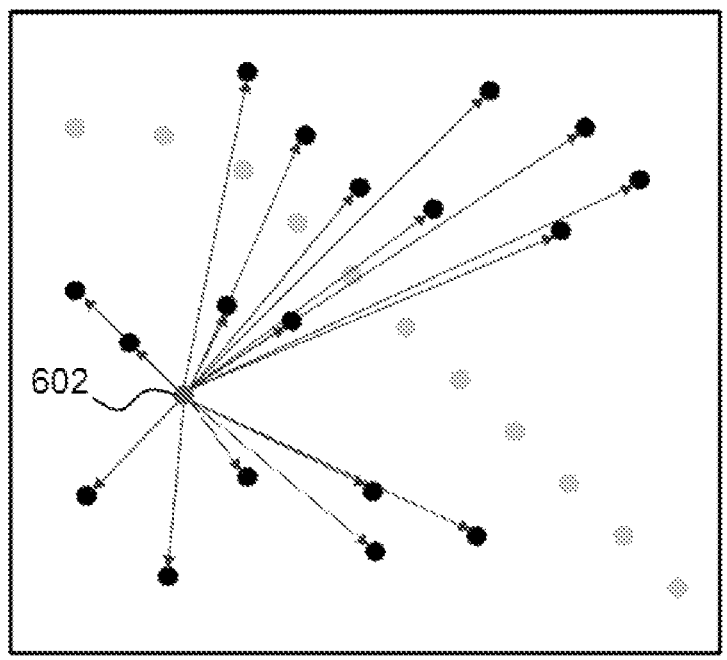
FIG. 11h shows an illustration of a step of the method of FIG. 10.

FIG. 11g shows a 2nd iteration of the process with selection of another point 602 of highest amplitude among the points remaining in the list to be processed. FIG. 11h shows the unit vectors computed based on the point 602.

Figure 11I:
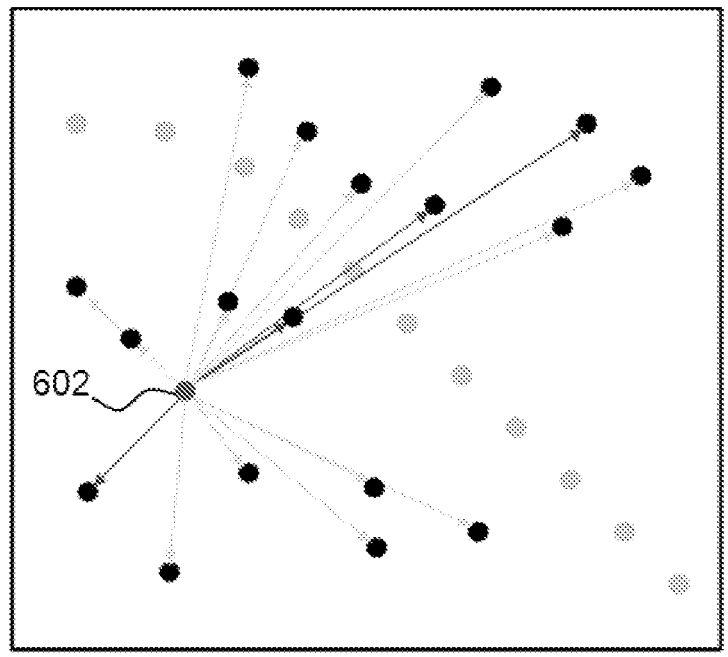
FIG. 11i shows an illustration of a step of the method of FIG. 10.
Figure 11J:
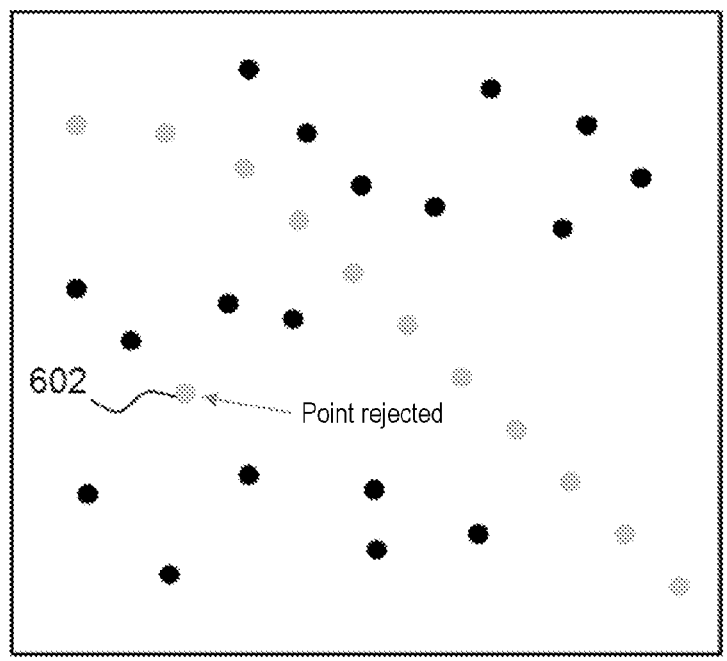
FIG. 11j shows an illustration of a step of the method of FIG. 10.

FIG. 11i shows the almost aligned points preserved. In this example, the number of almost aligned points is lower than $N_{min}$ and therefore point 602 is filtered (FIG. 11j).

Figure 12:
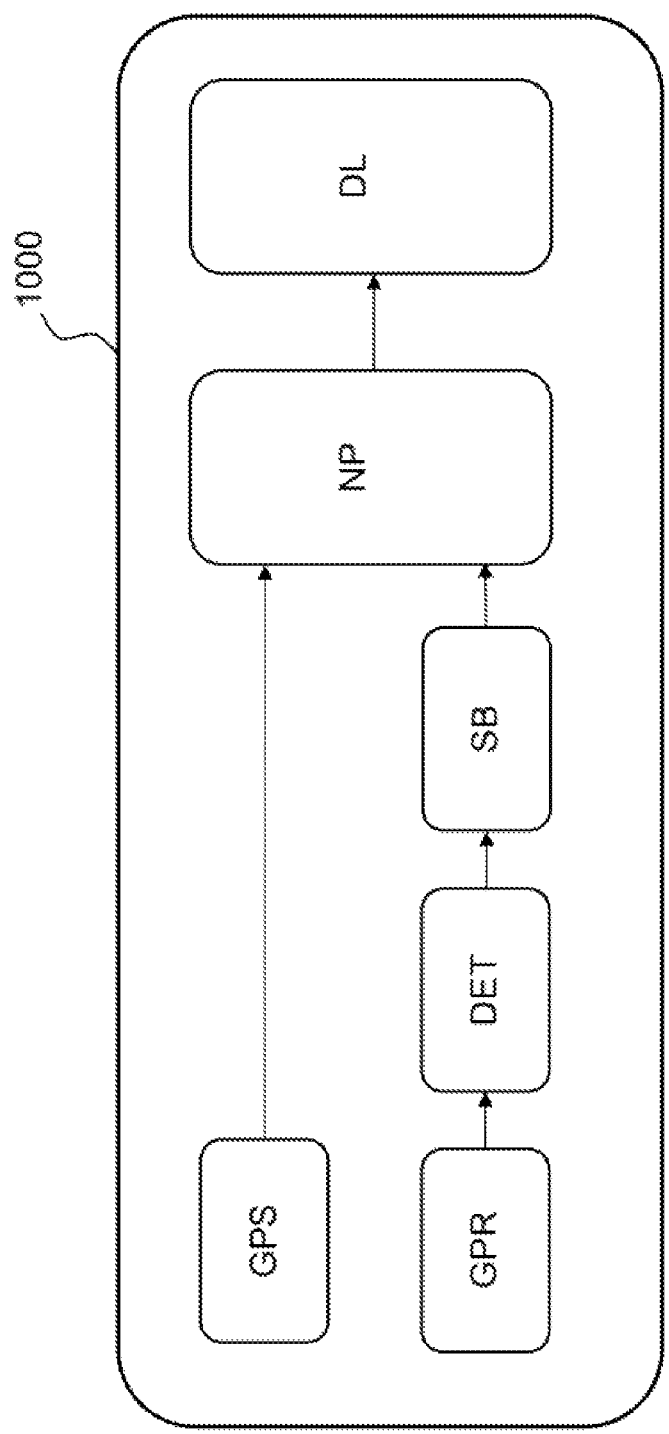
FIG. 12 shows a schematic of a line-detecting device according to a first embodiment of the invention.

FIG. 12 schematically shows a radar detecting device according to the invention. The device 1000 comprises a module GPR for acquiring radar signals, a geolocation module GPS, a radar detecting module DET allowing radar images of a plurality of planes of a region of ground to be generated based on radar signals acquired by the module GPR. A binary thresholding module SB is then applied to the radar images in order to preserve only points corresponding to detection of potential targets. A module NP for creating a 3D point cloud is applied to the result of the binarized images taking into account geolocation information. Lastly, a line-detecting module DL configured to execute the steps of the line-detecting method according to the invention and as described above is applied to the point cloud.

The various modules DET,SB,NP,SVU may be produced in software and/or hardware form, notably using one or more processors and one or more memories. The processor may be a generic processor, a specific processor, an application-specific integrated circuit (ASIC) or a field-programmable gate array (FPGA).

REFERENCES

[1] G. Zhan, L. Tsang, and K. Pak, "Studies of the angular correlation function of scattering by random rough surfaces with and without a buried object," *IEEE Trans. Geosci. Remote Sens.*, vol. 35, no. 2, pp. 444-453, March 1997.

[2] T. Dogaru and L. Carin, "Time-domain sensing of targets buried under a rough air-ground interface," *IEEE Trans. Antennas Propag.*, vol. 46, no. 3, pp. 360-372, March 1998.

[3] J. Brooks, L. van Kempen, and H. Sahli, "A primary study in adaptive clutter reduction and buried minelike target enhancement from GPR data," in *Proc. SPIE Detection and Remediation Technology for Mines and Minelike Targets V,* 2000, pp. 1183-1192.

[4] M. El-Shenawee and C. Rappaport, "Monte Carlo simulations for clutter statistics in minefields: AP-mine-like-target buried near a dielectric object beneath 2-D random rough surfaces," *IEEE Trans. Geosci. Remote Sens.*, vol. 40, no. 6, pp. 1416-1426, June 2002.

[5] D. D. Carevic, M. Craig, and I. Chant, "Modelling GPR echoes from landmines using linear combination of exponentially damped sinusoids," in *Proc. SPIE Detection and Remediation Technology for Mines and Minelike Targets II,* 1998, vol. 3079, pp. 1022-1032.

[6] Raffaele Solimene, A. Cuccaro, A. Dell'Aversano, Ilaria Catapano and Francesco Soldovieri, "Ground Clutter Removal in GPR Surveys". *IEEE journal of selected topics in applied earth observations and remote sensing*, vol. 7, no. 3, March 2014

[7] U. S. Khan and W. Al-Nuaimy, "Background removal from GPR data using Eigen values," presented at the 13th Int. Conf. Ground Penetrating Radar (GPR), Lecce, Italy, 2010.

[8] R. Solimene and A. D'Alterio, "Entropy based clutter rejection for intra-wall diagnostics," *Int. J. Geophys.*, vol. 2012, p. 7, 2012.

[9] Capineri, Lorenzo et al. "Advanced image-processing technique for real-time interpretation of ground-penetrating radar images." *International Journal of Imaging Systems and Technology* 9 (1998)

[10] Carlotto, Mark, "Detecting buried mines in ground penetrating radar using a Hough transform approach". Proceedings of SPIE—The International Society for Optical Engineering, 4741. 10.1117/12.478719, 2002.

The invention claimed is:

1. A computer-implemented method for detecting buried longitudinal structures using a ground-penetrating radar, the computer-implemented method comprising the steps of:
   measuring, with the ground-penetrating radar, acquiring a plurality of radar signals for a region of ground,
   determining with a processor, based on said radar signals, a 3D point cloud, each point corresponding to one radar detection and being geolocated in space,
   searching with the processor for at least one set of substantially aligned points in the 3D point cloud by:
   i. for each straight line among a set of straight lines of a 3D space, determining a number of points of the 3D point cloud that are located at a distance smaller than a predetermined minimum distance from the straight line, and
   ii. determining at least one straight line for which said number of points is higher than a predetermined minimum detection threshold, the points located at a distance from this straight line smaller than a minimum distance characterizing a longitudinal structure, and
   detecting at least a buried longitudinal structure from the at least one set of substantially aligned points.

2. The computer-implemented method for detecting according to claim 1, wherein the search for at least one set of substantially aligned points is carried out by means of steps of:
   determining at least a first straight line located in a first plane, for which straight line a set of points of the 3D point cloud in number higher than said predetermined minimum detection threshold is located at a distance from the first straight line smaller than said minimum distance, and
   determining at least a second straight line located in a second plane perpendicular to the first plane, for which straight line a sub-set of said set of points in number higher than said predetermined minimum detection threshold is located at a distance from the second straight line smaller than said minimum distance,
   wherein the points of said sub-set characterizing a longitudinal structure.

3. The computer-implemented method for detecting according to claim 1, wherein the search for at least one set of substantially aligned points is carried out by means of steps of:
   defining three mutually perpendicular projection planes in the 3D space and, for each of the three planes, determining at least one straight line located in said plane, for which straight line a set of points of the 3D point cloud in number higher than said predetermined minimum detection threshold is located at a distance from the straight line smaller than said minimum distance, and
   saving, for each straight line determined in the preceding step, the sets of points located at a distance from the straight line smaller than said minimum distance, constructing a set of points characterizing a longitudinal structure by selecting the points belonging to at least two sets of points saved for two different projection planes.

4. The computer-implemented method for detecting according to claim 1, wherein the straight lines are defined in a plane by a first parameter regarding distance between an origin of a reference coordinate system and the straight line and a second parameter regarding angle between an axis of the reference coordinate system and a line perpendicular to the straight line and passing through the origin of the reference coordinate system.

5. The computer-implemented method for detecting according to claim 1, further comprising a step of selecting lines for which a sum of amplitudes of the points of the set of points located at a distance from the line smaller than said minimum distance is larger than a predetermined threshold.

6. The computer-implemented method for detecting according to claim 1, wherein the points of the 3D point cloud are geolocated using a geolocation device of the ground-penetrating radar.

7. The computer-implemented method for detecting according to claim 1, wherein the radar signals are acquired for a plurality of planes in the region of ground.

8. A ground-penetrating radar comprising:
at least one transmit antenna;
at least one receive antenna; and
a device for detecting buried longitudinal structures in a region of ground, which is configured to execute the steps of the computer-implemented method for detecting according to claim 1.

9. A non-transitory computer program product comprising instructions for executing the computer-implemented detecting method for detecting according to claim 1, when the non-transitory computer program product is executed by a processor.

10. A non-transitory processor-readable storage medium, on which is stored a program comprising instructions for executing the computer-implemented detecting method for detecting according to claim 1, when the program is executed by a processor.

11. The computer-implemented method for detecting according to claim 1 wherein the ground-penetrating radar comprises at least one transmit antenna configured and/or operable to transmit the plurality of radar signals and at least one receive antenna configured and/or operable to receive the plurality of radar signals for a region of the ground.

12. The computer-implemented method for detecting according to claim 6 wherein the geolocation device comprises a device for receiving satellite radio-navigation signals and/or an odometer.

13. The ground-penetrating radar according to claim 6, wherein the device is configured and/or operable for acquiring radar signals;
wherein the device is further configured and/or operable for geolocation;
wherein the device is further configured and/or operable for radar detecting; and
wherein the device is further configured and/or operable to preserve only points corresponding to detection of potential targets.

14. A ground-penetrating radar comprising:
at least one transmit antenna configured and/or operable to transmit a plurality of radar signals;
at least one receive antenna configured and/or operable to receive the plurality of radar signals for a region of ground;
the ground-penetrating radar being configured and/or operable to measure the plurality of radar signals for a region of ground;
a device being configured and/or operable to determine based on said radar signals, a 3D point cloud, each point corresponding to one radar detection and being geolocated in space with a geolocation device;
the device being configured and/or operable to search for at least one set of substantially aligned points in the 3D point cloud by:
i. for each straight line among a set of straight lines of a 3D space, determining a number of points of the 3D point cloud that are located at a distance smaller than a predetermined minimum distance from the straight line, and
ii. determining at least one straight line for which said number of points is higher than a predetermined minimum detection threshold, the points located at a distance from this straight line smaller than a minimum distance characterizing a longitudinal structure; and
the device being configured and/or operable to detect at least a buried longitudinal structure from the at least one set of substantially aligned points.

\* \* \* \* \*

UNITED STATES PATENT AND TRADEMARK OFFICE
CERTIFICATE OF CORRECTION

| | | |
|---|---|---|
| PATENT NO. | : 12,442,914 B2 | Page 1 of 1 |
| APPLICATION NO. | : 18/126902 | |
| DATED | : October 14, 2025 | |
| INVENTOR(S) | : Jean-Baptiste Dore | |

It is certified that error appears in the above-identified patent and that said Letters Patent is hereby corrected as shown below:

In the Claims

In Claim 1, Column 11, Line 63, "with the ground-penetrating radar, acquiring a plurality of radar signals" should be -- with the ground-penetrating radar, a plurality of radar signals --.

Signed and Sealed this
Twenty-third Day of December, 2025

John A. Squires
*Director of the United States Patent and Trademark Office*